US012706711B2

(12) United States Patent
Wang et al.

(10) Patent No.: US 12,706,711 B2
(45) Date of Patent: Aug. 11, 2026

(54) SOUNDING REFERENCE SIGNAL REPETITION CONFIGURATION

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Yu Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 550 days.

(21) Appl. No.: 18/249,086

(22) PCT Filed: Dec. 24, 2020

(86) PCT No.: PCT/CN2020/138854

§ 371 (c)(1),
(2) Date: Apr. 14, 2023

(87) PCT Pub. No.: WO2022/133861

PCT Pub. Date: Jun. 30, 2022

(65) Prior Publication Data

US 2023/0396379 A1 Dec. 7, 2023

(51) Int. Cl.
*H04L 5/00* (2006.01)

(52) U.S. Cl.
CPC .......... *H04L 5/0048* (2013.01); *H04L 5/0012* (2013.01); *H04L 5/0094* (2013.01)

(58) Field of Classification Search
None
See application file for complete search history.

(56) References Cited

U.S. PATENT DOCUMENTS 8,787,181 B2 * 7/2014 Gaal ........................ H04J 13/16 370/252
11,476,992 B2 * 10/2022 Choi ...................... H04B 1/692
(Continued)

FOREIGN PATENT DOCUMENTS

CN 102158252 A * 8/2011 ............. H04B 1/713
CN 102291208 A * 12/2011
(Continued)

OTHER PUBLICATIONS

3GPP TS 36.211 v16.3.0 (Sep. 2020).*
(Continued)

*Primary Examiner* — Andrew C Oh
(74) *Attorney, Agent, or Firm* — Harrity & Harrity LLP

(57) ABSTRACT

Various aspects of the present disclosure generally relate to wireless communication. In some aspects, a user equipment (UE) may receive configuration information that configures a reference signal (RS) transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols. The UE may perform the RS transmission using the repetition factor in accordance with the configuration. Numerous other aspects are described.

30 Claims, 13 Drawing Sheets

(56) References Cited

U.S. PATENT DOCUMENTS

2009/0196229 A1* 8/2009 Shen .................... H04B 1/69 370/328
2012/0176999 A1* 7/2012 Zhang .................. H04L 5/0048 370/329
2012/0250655 A1* 10/2012 Noh .................... H04L 27/2605 370/330
2013/0121130 A1* 5/2013 Ko ...................... H04L 5/0094 370/208
2014/0241188 A1* 8/2014 Park .................... H04L 5/0048 370/252
2015/0063238 A1* 3/2015 Yokomakura ......... H04L 27/261 370/329
2019/0052420 A1* 2/2019 Manolakos ........... H04L 5/0051
2019/0109732 A1* 4/2019 Choi .................... H04L 5/0051
2020/0028730 A1* 1/2020 Fan ..................... G06F 11/2048
2020/0059338 A1 2/2020 Joseph et al.
2020/0153588 A1* 5/2020 Hwang ................. H04L 5/0051
2020/0235878 A1* 7/2020 Yang ..................... H04W 72/12
2020/0235881 A1 7/2020 Choi et al.
2020/0366439 A1 11/2020 Choi et al.
2020/0367284 A1* 11/2020 Lei .................... H04W 74/0841
2020/0383089 A1* 12/2020 Goto .................... H04L 1/1822
2021/0058971 A1* 2/2021 MolavianJazi ..... H04W 56/001
2021/0184812 A1* 6/2021 MolavianJazi ....... H04L 1/0041
2021/0195654 A1* 6/2021 Lei .................... H04W 74/0833
2021/0328838 A1* 10/2021 Black .................. H04L 25/0212
2021/0345390 A1* 11/2021 Okamura ........... H04B 7/06966
2022/0069953 A1* 3/2022 Cho ...................... G01S 19/10
2023/0239088 A1* 7/2023 Gao ...................... H04L 5/0051 370/329

FOREIGN PATENT DOCUMENTS

CN 113812113 A * 12/2021 ......... H04L 27/2607
ID P202300914 A * 1/2023
KR 20100059945 A * 6/2010 ........... H04L 5/0042
KR 20140142693 A * 12/2014 ........... H04W 72/23
KR 101589563 B1 * 1/2016 ............ H04W 72/21
SG 11202108842 T * 9/2021 ............ H04W 72/23
WO WO-2011077743 A1 * 6/2011 .......... H04J 11/0023
WO WO-2012021139 A1 * 2/2012 ............ H04W 72/20
WO 2013049995 A1 4/2013
WO 2018086587 5/2018
WO WO-2018204340 A1 * 11/2018 ......... H04B 7/06966
WO 2019027995 A1 2/2019
WO 2019028836 A1 2/2019
WO WO-2019098712 A1 * 5/2019 ........... H04L 5/0012
WO 2020018811 A2 1/2020
WO WO-2020056180 A1 * 3/2020 ........... H04L 5/0051
WO WO-2020250324 A1 * 12/2020 ........... H04L 5/0051
WO WO-2021009875 A1 * 1/2021 ........... H04L 5/0023
WO WO-2022047735 A1 * 3/2022 ........... H04L 5/0094

OTHER PUBLICATIONS

Supplementary European Search Report—EP20966434—Search Authority—The Hague—Jul. 23, 2024.

Huawei, et al., "Enhancements on SRS for Rel-17", R1-2005247, 3GPP TSG RAN WG1 Meeting #102-e, Aug. 28, 2020 (Aug. 28, 2020), 9 Pages, XP051917295, Retrieved from the Internet: URL: https://ftp.3gpp.org/tsg_ran/WG1_RL1/TSGR1_102-e/Docs/R1-2005247.zip. [Retrieved on Aug. 8, 2020], Sections 4.1 and 4.3, figures 9,10, sections 4-5.

International Search Report and Written Opinion—PCT/CN2020/138854—ISA/EPO—Sep. 24, 2021.

OPPO: "Remaining Issues on SRS Design", 3GPP Draft, 3GPP TSG RAN WG1 Meeting #93, R1-1806828, 3rd Generation Partnership Project (3GPP), Mobile Competence Centre, 650, Route Des Lucioles, F-06921, Sophia-Antipolis Cedex, France, vol. RAN WG1, No. Busan, Korea; May 21, 2018-May 25, 2018, May 11, 2018 (May 11, 2018), XP051461980, 3 pages, p. 1-p. 3.

3GPP: "3rd Generation Partnership Project, Technical Specification Group Radio Access Network, NR, Physical Channels and Modulation (Release 18)", 3GPP TS 38.211 V18.7.0, Jun. 2025, pp. 1-166.

* cited by examiner

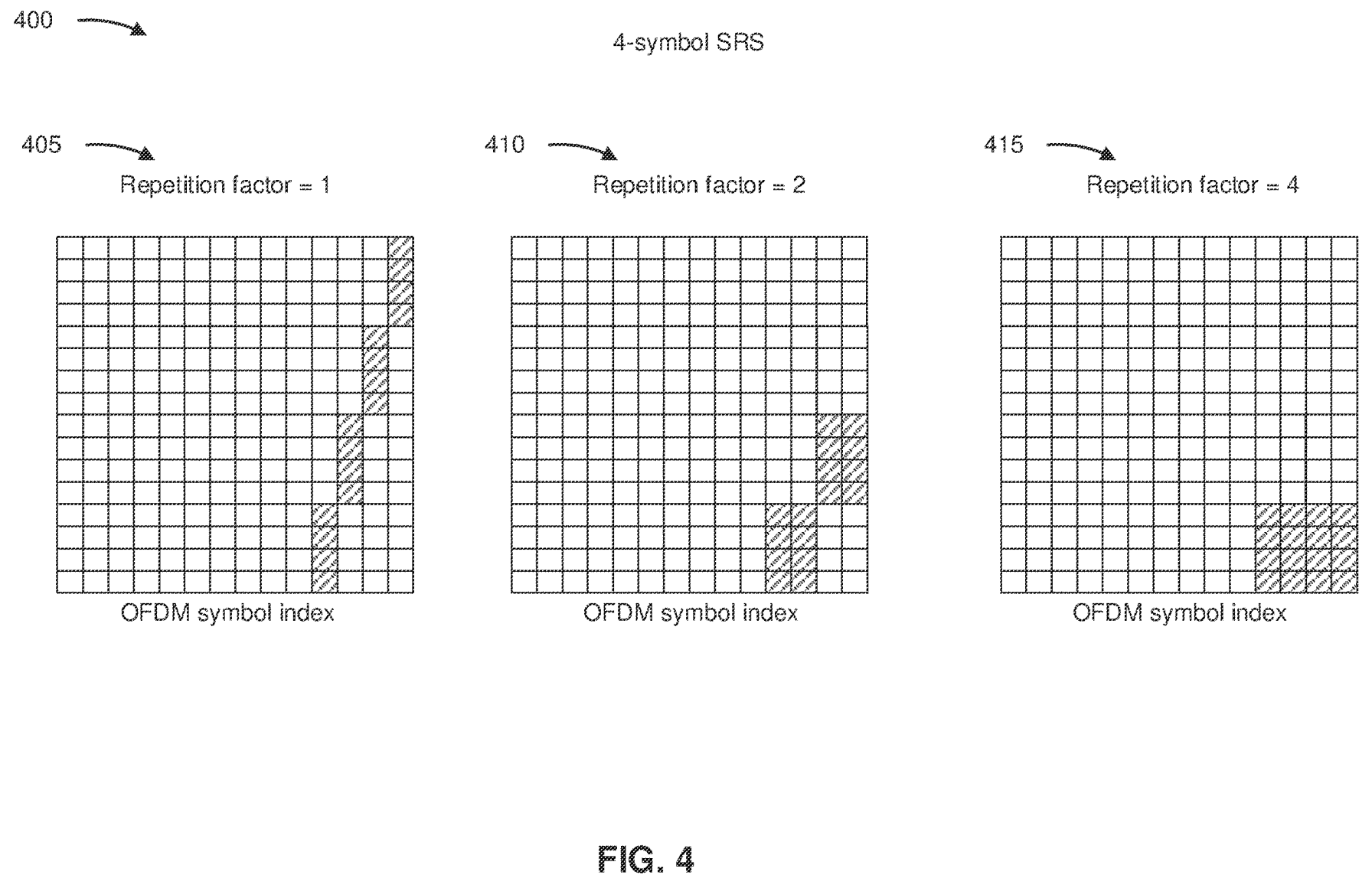

400

4-symbol SRS

405

Repetition factor = 1

OFDM symbol index

410

Repetition factor = 2

OFDM symbol index

415

Repetition factor = 4

OFDM symbol index

FIG. 4

Sequence hopping configuration

Sequence 1
Sequence 2

Cyclic shift offset configuration

CS Offset 1
CS Offset 2
CS Offset 3
CS Offset 4

900

Frequency hopping configuration

Repetition group 1
Repetition group 2

1000

1100

SOUNDING REFERENCE SIGNAL REPETITION CONFIGURATION

CROSS-REFERENCE TO RELATED APPLICATION

This application is a 371 national stage of PCT Application No. PCT/CN2020/138854 filed on Dec. 24, 2020, entitled "SOUNDING REFERENCE SIGNAL REPETITION CONFIGURATION," which is hereby expressly incorporated by reference herein.

FIELD OF THE DISCLOSURE

Aspects of the present disclosure generally relate to wireless communication and to techniques and apparatuses for sounding reference signal (SRS) repetition configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving configuration information that configures a reference signal (RS) transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and performing the RS transmission using the repetition factor in accordance with the configuration.

In some aspects, a method of wireless communication performed by a base station includes transmitting configuration information that configures an RS transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and receiving the RS transmission using the repetition factor in accordance with the configuration.

In some aspects, a UE for wireless communication includes a memory and one or more processors operatively coupled to the memory, the memory and the one or more processors configured to: receive configuration information that configures an RS transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and perform the RS transmission using the repetition factor in accordance with the configuration.

In some aspects, a base station for wireless communication includes a memory and one or more processors operatively coupled to the memory, the memory and the one or more processors configured to: transmit configuration information that configures an RS transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and receive the RS transmission using the repetition factor in accordance with the configuration.

In some aspects, a non-transitory computer-readable medium storing a set of instructions for wireless communication includes one or more instructions that, when executed by one or more processors of a UE, cause the UE to: receive configuration information that configures an RS transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and perform the RS transmission using the repetition factor in accordance with the configuration.

In some aspects, a non-transitory computer-readable medium storing a set of instructions for wireless communication includes one or more instructions that, when executed by one or more processors of a base station, cause the base station to: transmit configuration information that configures an RS transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and receive the RS transmission using the repetition factor in accordance with the configuration.

In some aspects, an apparatus for wireless communication includes means for receiving configuration information that configures an RS transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and means for performing the RS transmission using the repetition factor in accordance with the configuration.

In some aspects, an apparatus for wireless communication includes means for transmitting configuration information that configures an RS transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and means for receiving the RS transmission using the repetition factor in accordance with the configuration.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of repetition schemes for an SRS, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
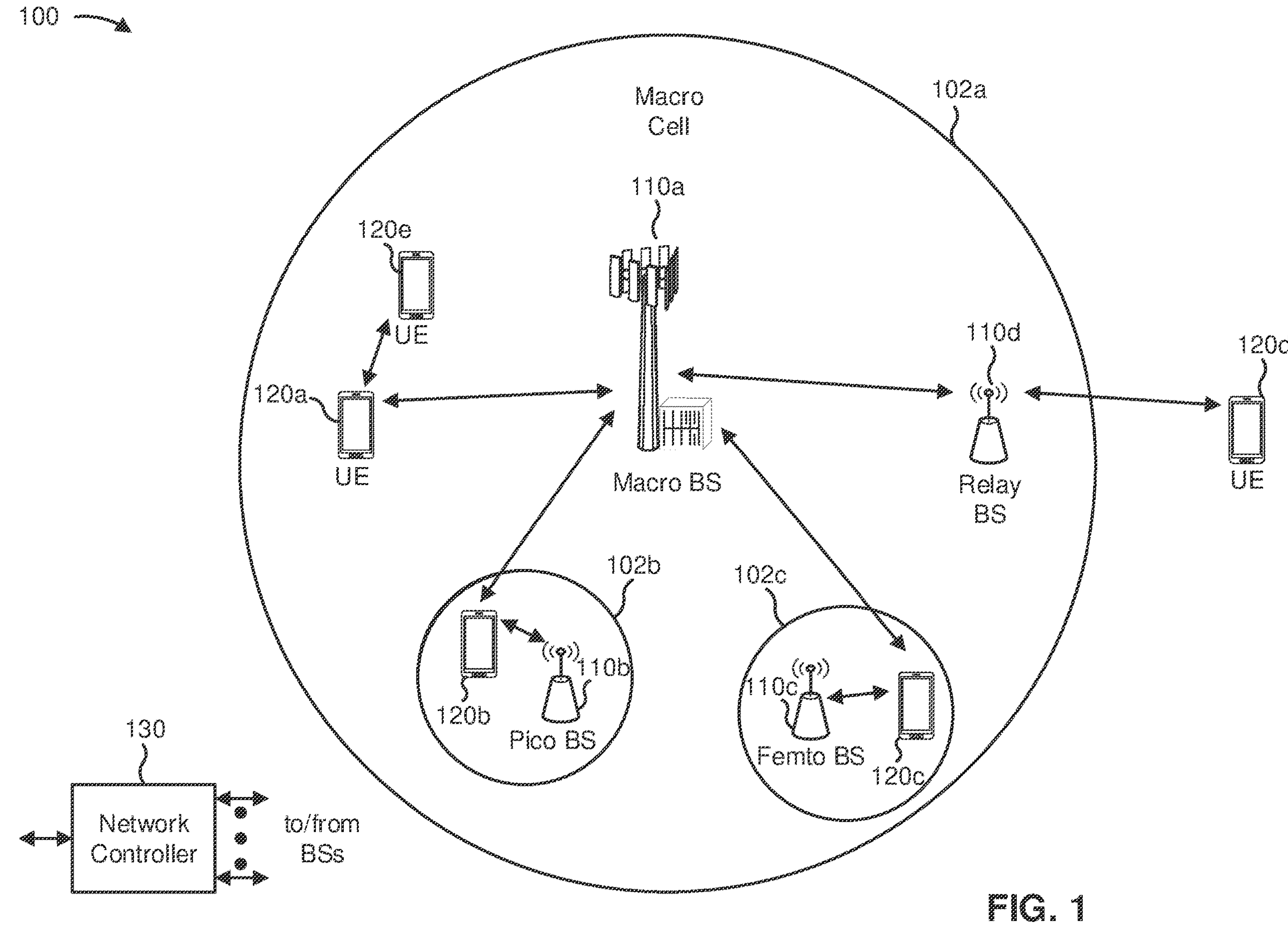
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
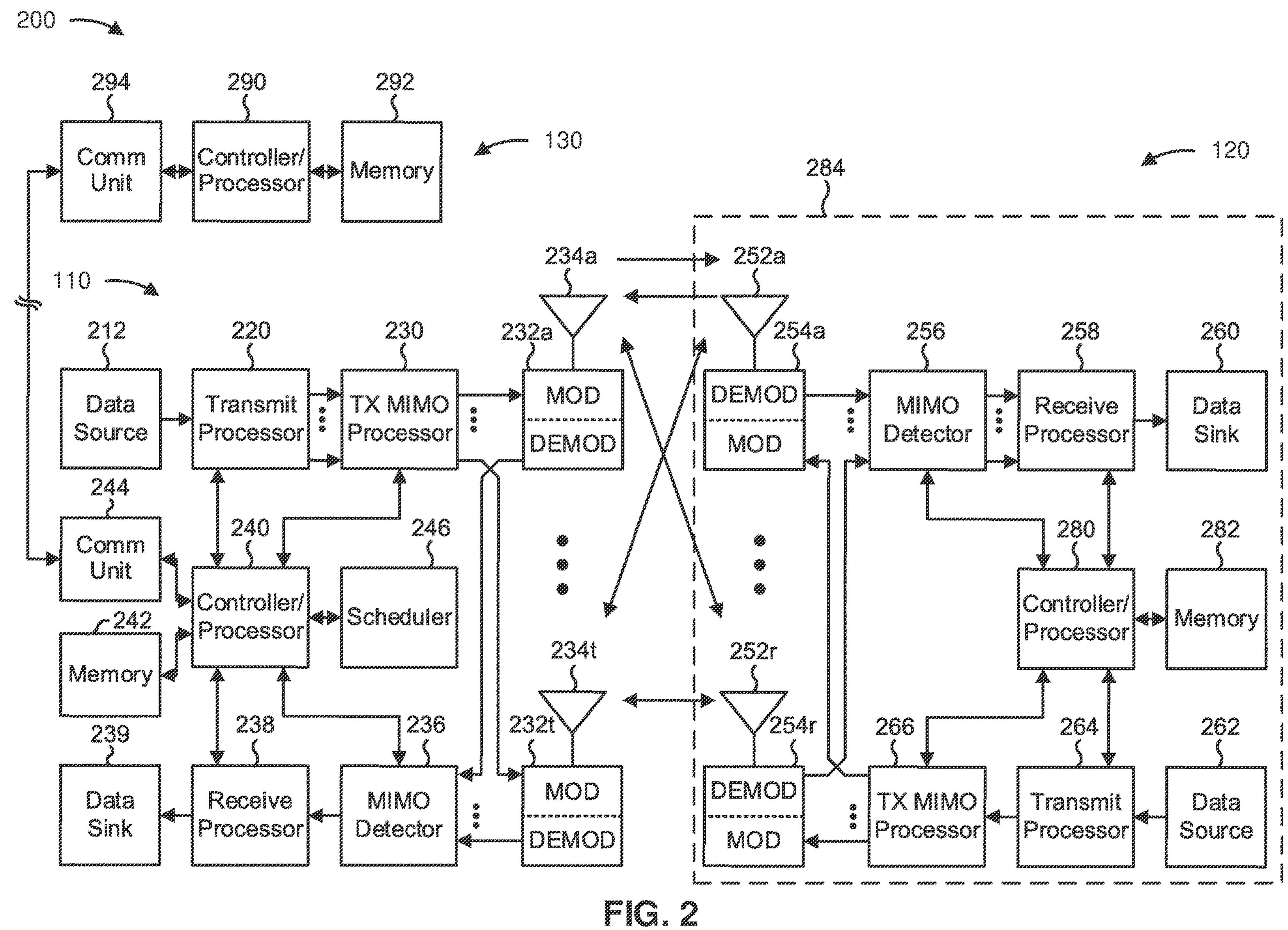
FIG. 2 is a diagram illustrating an example of a base station in communication with a UE in a wireless network, in accordance with various aspects of the present disclosure.

FIG. 2 is a diagram illustrating an example 200 of abase station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-11.

Controller/processor 240 of base station 110, controller/processor 280 of UE 120, and/or any other component(s) of FIG. 2 may perform one or more techniques associated with SRS repetition configuration, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, the UE 120 includes means for receiving configuration information that configures an RS transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and/or means for performing the RS transmission using the repetition factor in accordance with the configuration. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for determining a list of cyclic shift offsets based at least in part on the initial cyclic shift offset and a pre-defined sequence.

In some aspects, the BS 110 includes means for transmitting configuration information that configures an RS transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and/or means for receiving the RS transmission using the repetition factor in accordance with the configuration. The means for BS 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
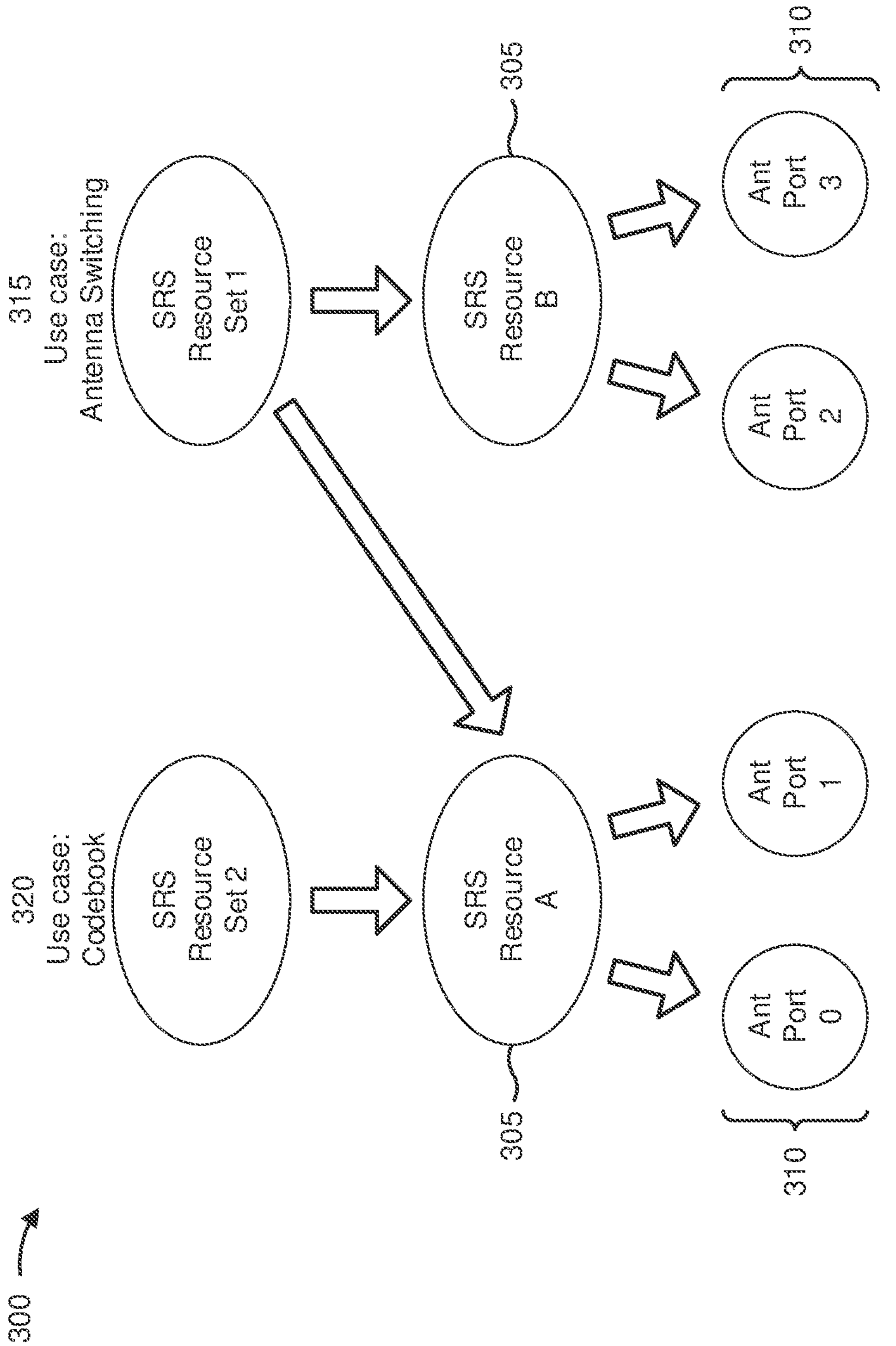
FIG. 3 is a diagram illustrating an example of sounding reference signal (SRS) resource sets, in accordance with various aspects of the present disclosure.

FIG. 3 is a diagram illustrating an example 300 of SRS resource sets, in accordance with various aspects of the present disclosure.

A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message, an RRC reconfiguration message, and/or the like). As shown by reference number 305, an SRS resource set may include one or more resources (e.g., shown as SRS resources), which may include time resources and/or frequency resources (e.g., a slot, a symbol, a resource block, a periodicity for the time resources, and/or the like).

As shown by reference number 310, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, beam management, and/or the like.

An antenna switching SRS resource set may be used to indicate downlink CSI with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicated an uplink precoder to be used by the UE 120. For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where $X \leq 4$). In some aspects, each of the X SRS ports may mapped to a corresponding symbol of the SRS resource and used for transmission of an SRS in that symbol.

As shown in FIG. 3, in some aspects, different SRS resource sets indicated to the UE 120 (e.g., having different use cases) may overlap (e.g., in time, in frequency, and/or the like, such as in the same slot). For example, as shown by reference number 315, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 320, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As indicated above, FIG. 3 is provided as an example. Other examples may differ from what is described with regard to FIG. 3.

FIG. 4 is a diagram illustrating an example 400 of repetition schemes for an SRS, in accordance with various aspects of the present disclosure. Example 400 shows a 4-symbol SRS. An SRS may be configured to occupy a number of symbols (e.g., orthogonal frequency division multiplexing (OFDM) symbols), such as 1 symbol, 2 symbols, 4 symbols, or the like. A symbol to which an SRS is mapped is referred to herein as an RS symbol or an SRS symbol, and those terms are used interchangeably with each other. Example 400 shows examples of a slot including 14 OFDM symbols and 16 frequency-domain subdivisions (where frequency-domain subdivisions are shown in the vertical direction). The frequency-domain subdivisions may be subcarriers, groups of subcarriers, or the like.

An SRS can be configured with a repetition factor. The repetition factor identifies a number of repetitions of the SRS to be transmitted in a given set of subcarriers. Reference number 405 shows an SRS with a repetition factor of 1. As shown, an SRS is transmitted in a first set of subcarriers for one symbol, then a second set of subcarriers for one symbol, then a third set of subcarriers for one symbol, then a fourth set of subcarriers for one symbol. Reference number 410 shows an SRS with a repetition factor of 2. As shown, an SRS is transmitted in a first set of subcarriers for two symbols, then a second set of subcarriers for two symbols. Reference number 415 shows an SRS with a repetition factor of 4. As shown, an SRS is transmitted in a first set of subcarriers for four symbols. The usage of a larger repetition factor improves coverage for certain UEs, such as cell-edge UEs. The usage of a smaller repetition factor increases the bandwidth that a single UE can sound.

An SRS is a reference signal which may be generated in accordance with a sequence. The sequence may be a numerical sequence, such as a Zadoff Chu (ZC) sequence, though other sequences may be used. A base station can configure different UEs to use different cyclic shifts (sometimes abbreviated CS) for a sequence to increase the number of UEs that can use a given sequence. A cyclic shift identifies a starting position in the sequence. For example, a sequence of [1 2 3 4] may be cyclically shifted to generate sequences of [1 2 3 4], [2 3 4 1], [3 4 1 2], and [4 1 2 3], thereby increasing the number of UEs that can orthogonally transmit RSs from one to four. The cyclic shift can be treated as a phase offset for a modulation constellation used to transmit the SRS. The cyclic shift $\alpha$, to be used by a given UE may be identified by a cyclic shift offset n. In the above example, the cyclically shifted sequences may be generated using cyclic shift offsets of 0, 1, 2, and 3, respectively.

The implementation of SRS signaling with repetition-based coverage enhancement improves coverage for cell-edge UEs, lower-capability UEs, and the like. However, many aspects of SRS configuration do not take into account the repetition factor, which constrains the flexibility and diversity of SRS signaling. For example, in some deployments, a sequence for each RS symbol of an SRS is constrained to be the same for all RS symbols or different for all RS symbols. As another example, in some deployments, a cyclic shift offset may be constrained to be the same for all RS symbols of an SRS. As yet another example, an SRS may be constrained to use the same set of subcarriers for each RS symbol within a repetition group. These constraints reduce the diversity achievable in a wireless communication system, which reduces the number of UEs that can be configured to perform SRS signaling in a given system, and reduces the accuracy and versatility of SRS signaling configuration.

Some techniques and apparatuses described herein enable enhancements for configuration of repetition-based SRS transmissions (e.g., SRS transmissions using a repetition factor). For example, some techniques and apparatuses described herein provide for different sequences to be configured for different RS symbols of an SRS transmission. As another example, techniques and apparatuses described herein provide for different cyclic shift offsets to be used for different RS symbols of an SRS transmission. As yet another example, techniques and apparatuses described herein provide for different sets of subcarriers to be used for RS symbols in a repetition group. In this way, flexibility and diversity of SRS configuration are improved, which increases the number of UEs that can be configured to perform SRS signaling in a given system (thereby improving multi-user SRS signaling), and which improves the efficacy of channel estimation based at least in part on SRS signaling.

As indicated above, FIG. 4 is provided as an example. Other examples may differ from what is described with regard to FIG. 4.

Figure 5:
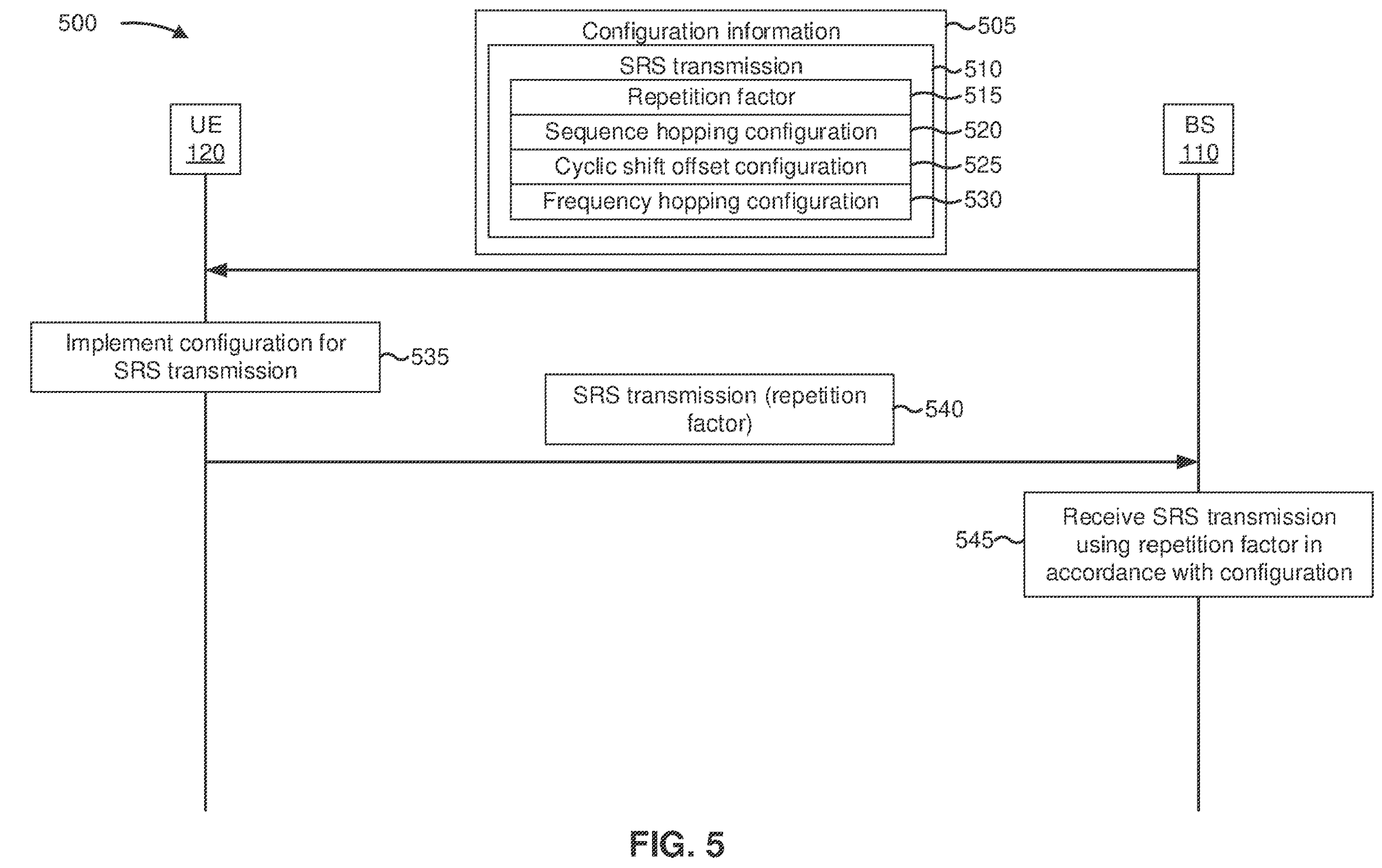
FIG. 5 is a diagram illustrating an example of signaling associated with SRS repetition configuration, in accordance with various aspects of the present disclosure.

FIG. 5 is a diagram illustrating an example 500 of signaling associated with SRS repetition configuration, in accordance with various aspects of the present disclosure. As shown, example 500 includes a UE 120 and a BS 110.

As shown by reference number 505, the BS 110 may provide configuration information to the UE 120. For example, the BS 110 may provide the configuration information via control signaling, such as radio resource control (RRC) signaling or the like. As shown by reference number 510, the configuration information may include information that configures an SRS transmission. For example, the configuration information may include a set of information elements (IEs) (e.g., an SRS-Resource IE or the like) configuring the UE 120 to perform an SRS transmission. In some aspects, the configuration information may include information indicating a repetition type. As used herein, a repetition type is a mode that indicates a configuration for an SRS associated with a repetition factor. For example, the repetition type may explicitly or implicitly indicate one or more parameters for the SRS transmission, such as one or more of the parameters shown by reference numbers 515, 520, 525, and 530.

As shown by reference number 515, in some aspects, the configuration information may indicate a repetition factor. For example, the configuration information may include a parameter indicating the repetition factor. As another example, a repetition type of the configuration information may indicate the repetition factor. The repetition factor may indicate a number of repetitions for the SRS transmission, as described elsewhere herein. In some aspects, the configuration information may include one or more other parameters regarding an SRS resource, such as information indicating a start position for an SRS transmission, information indicating a number of symbols for the SRS transmission, or the like.

As shown by reference number 520, in some aspects, the configuration information may indicate a sequence hopping configuration. For example, the configuration information may include a parameter indicating the sequence hopping configuration. In some aspects, a sequence hopping configuration may indicate a set of sequences to be used for one or more RS symbols. In some aspects, a sequence hopping configuration may indicate an order of sequences to be used for one or more RS symbols. In some aspects, a sequence hopping configuration may indicate a rule for determining a sequence to be used for an RS symbol based at least in part on an RS symbol index. In some aspects, a sequence hopping configuration may indicate a rule for determining a sequence to be used for an RS symbol based at least in part on a set of subcarriers associated with the RS symbol.

Figure 6:
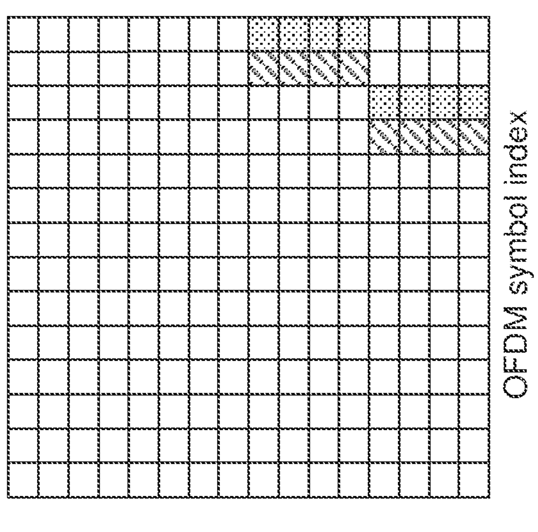
FIG. 6 is a diagram illustrating examples of sequences for a set of RS symbols based at least in part on a sequence hopping configuration, in accordance with various aspects of the present disclosure.
Figure 6:
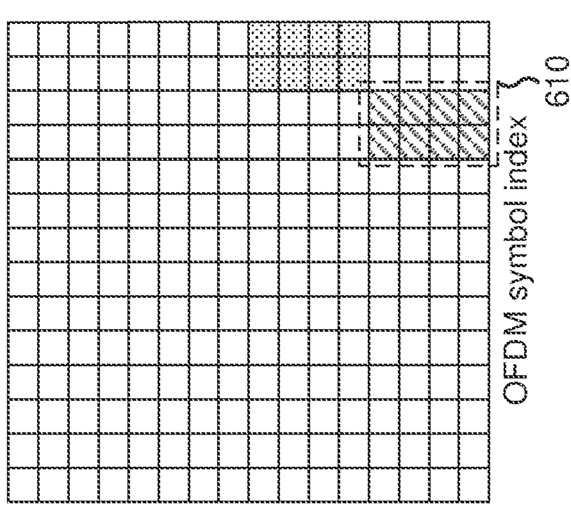

FIG. 6 is a diagram illustrating examples 600 and 605 of sequences for a set of RS symbols based at least in part on a sequence hopping configuration, in accordance with various aspects of the present disclosure. Examples 600 and 605 show RS resources in accordance with a sequence hopping configuration, such as a sequence hopping configuration shown by reference number 520. In example 600, the sequence hopping configuration indicates that a same sequence is to be used for RS symbols in the same set of subcarriers, and that different sequences can be used for RS symbols in different sets of subcarriers. Therefore, Sequence 1 is used for an earlier set of RS symbols in a first set of subcarriers, and Sequence 2 is used for a later set of RS symbols in a second set of subcarriers. In this case, the earlier set of RS symbols and the later set of RS symbols may be associated with a single SRS transmission with a repetition factor of 2.

In example 605, the sequence hopping configuration indicates that different sequences can be used for RS symbols in the same set of subcarriers, and that the same sequences can be used for RS symbols in different sets of subcarriers. Therefore, Sequence 1 is used for a first RS symbol in a first set of subcarriers, and Sequence 2 is used for a second RS symbol in the first set of subcarriers. In this case, the first set of subcarriers (and the first RS symbol and the second RS symbol) may be associated with a single SRS transmission with a repetition factor of 2. Furthermore, Sequence 1 is used for a third RS symbol in a second set of subcarriers, and Sequence 2 is used for a fourth RS symbol in the second set of subcarriers, wherein the third RS symbol and the fourth RS symbol are associated with the single SRS transmission with the repetition factor of 2.

In some aspects, different sequences may include different types of sequences (e.g., one sequence may be a ZC sequence whereas another sequence may be a Gold sequence). In some aspects, different sequences may include a same type of sequence with different root values, such that different sequences of the same type are generated. Thus, two or more different sequences can be used for two or more RS symbols of an SRS transmission, which improves diversity and efficacy of SRS signaling.

Returning to FIG. 5, as shown by reference number 525, in some aspects, the configuration information may indicate a cyclic shift offset configuration. For example, the configuration information may include a parameter indicating the cyclic shift offset configuration. In some aspects, a cyclic shift offset configuration may indicate how a cyclic offset is to be determined for one or more RS symbols of an SRS transmission. In some aspects, the cyclic shift offset configuration may indicate a list of cyclic shift offsets (e.g., via RRC signaling or the like), and the UE 120 may apply cyclic shift offsets, identified by the list, to RS symbols of the SRS transmission. In this case, if there are more RS symbols than cyclic shift offsets in the list, then the UE 120 may repeat the list (e.g., may wrap around to a beginning of the list) when assigning the cyclic shift offsets. In some aspects, the cyclic shift offset configuration may indicate a repetition factor, and may indicate the list of cyclic shift offsets specific to the repetition factor. For example, for a repetition factor of 2, a parameter cyclicShiftList-n2 may indicate SEQUENCE (SIZE(1 . . . maxNrofCSList-1)) of INTEGER (0 . . . 7), and for a repetition factor of 4, a parameter cyclicShiftList-n4 may indicate SEQUENCE (SIZE(1 . . . maxNrofCSList-1)) of INTEGER (0 . . . 11).

In some aspects, the UE 120 may determine the cyclic shift offset configuration. For example, the UE 120 may receive information indicating a rule for determining a cyclic shift offset (and therefore a cyclic shift) for a group of RS symbols. As used herein, a group of RS symbols is a set of RS symbols that are associated with a given repetition factor, such as the group shown by reference number 610 in FIG. 6. In some aspects, the rule may indicate a pre-defined sequence of CS offsets, and the UE 120 may determine cyclic shift offsets for one or more groups of RS symbols in accordance with the predefined sequence (e.g., a first CS offset of the pre-defined sequence for a first group of RS symbols, a second CS offset of the pre-defined sequence for a second group of RS symbols, and so on). In some aspects, the rule may indicate a first CS offset (e.g., X) and an offset for subsequent CS offsets (e.g., K), and the UE 120 may determine CS offsets for groups of RS symbols using the first CS offset and the offset (e.g., X for a first group of RS symbols, X+K for a second group of RS symbols, X+2K for a third group of RS symbols, and so on).

In some aspects, the cyclic shift offset configuration may be associated with a maximum number of cyclic shift offsets. For example, the cyclic shift offset configuration may indicate a list of cyclic shift offsets that includes up to the maximum number of cyclic shift offsets. In some aspects, the maximum number of cyclic shift offsets may be based at least in part on whether group-based cyclic shift is applied. For example, the cyclic shift offset configuration may be associated with a first maximum number of cyclic shift offsets for a first repetition factor (where group based cyclic shift is not applied) and a second maximum number of cyclic shift offsets for a second repetition factor (where group based cyclic shift is applied). As another example, the cyclic shift offset configuration may indicate a modified maximum number of cyclic shifts based at least in part on the configuration information (e.g., where the maximum number is modified relative to a baseline maximum number). Thus, the cyclic shift offset configuration may ensure that there are sufficient cyclic shift offsets available for the SRS transmission.

Figure 7:
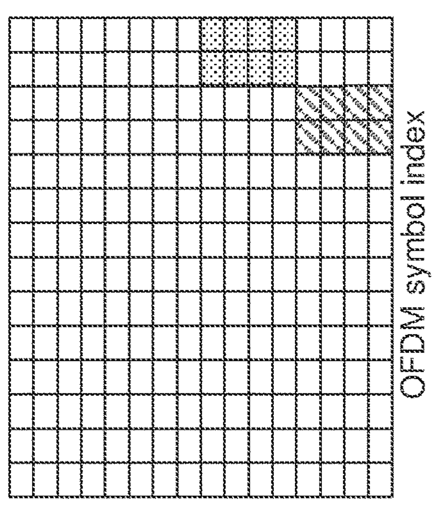
FIG. 7 is a diagram illustrating examples of SRS transmission using a cyclic shift offset configuration, in accordance with various aspects of the present disclosure.
Figure 7:
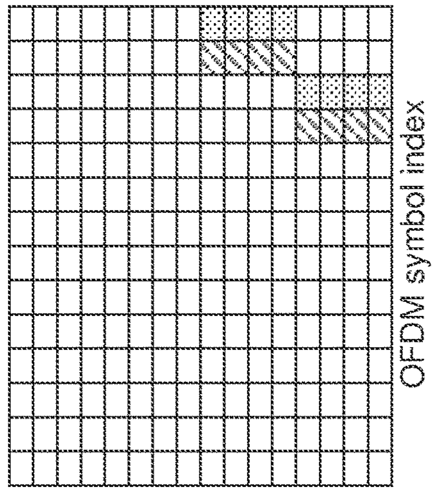
Figure 7:
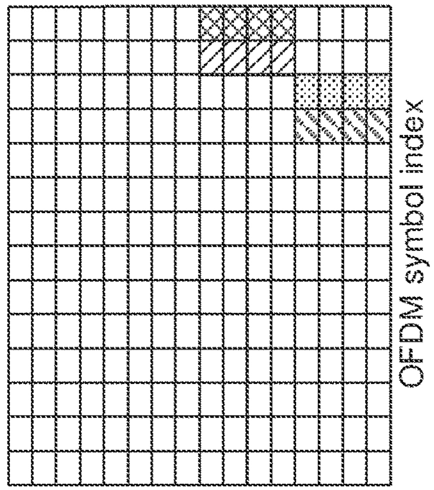

FIG. 7 is a diagram illustrating examples 700, 705, and 710 of SRS transmission using a cyclic shift offset configuration, in accordance with various aspects of the present disclosure. In example 700, the cyclic shift offset configuration indicates that a different cyclic shift offset is to be used for each RS symbol of an RS transmission. For example, the cyclic shift offset configuration may indicate a plurality of cyclic shift offsets corresponding to a plurality of RS symbols of the RS transmission.

In example 705, the cyclic shift offset configuration indicates that different cyclic shift offsets can be used for RS symbols in the same set of subcarriers, and that the same cyclic shift offset can be used for RS symbols with a same index in a repetition group in different sets of subcarriers. Therefore, CS offset 1 is used for a first RS symbol in a first set of subcarriers, and CS offset 2 is used for a second RS symbol in the first set of subcarriers. Furthermore, CS offset 1 is used for a third RS symbol in a second set of subcarriers, and CS offset 2 is used for a fourth RS symbol in the second set of subcarriers, wherein the first RS symbol and the third RS symbol have indexes of 0 in their respective repetition groups and the third RS symbol and the fourth RS symbol have indexes of 1 in their respective repetition groups.

In example 710, the cyclic shift offset configuration indicates that the same cyclic shift offsets can be used for RS symbols in the same set of subcarriers, and that different cyclic shift offsets can be used for RS symbols in different sets of subcarriers. Therefore, CS offset 1 is used for a first RS symbol and a second RS symbol in a first set of subcarriers, and CS offset 2 is used for a third RS symbol and a fourth RS symbol in a second set of subcarriers.

Figure 8:
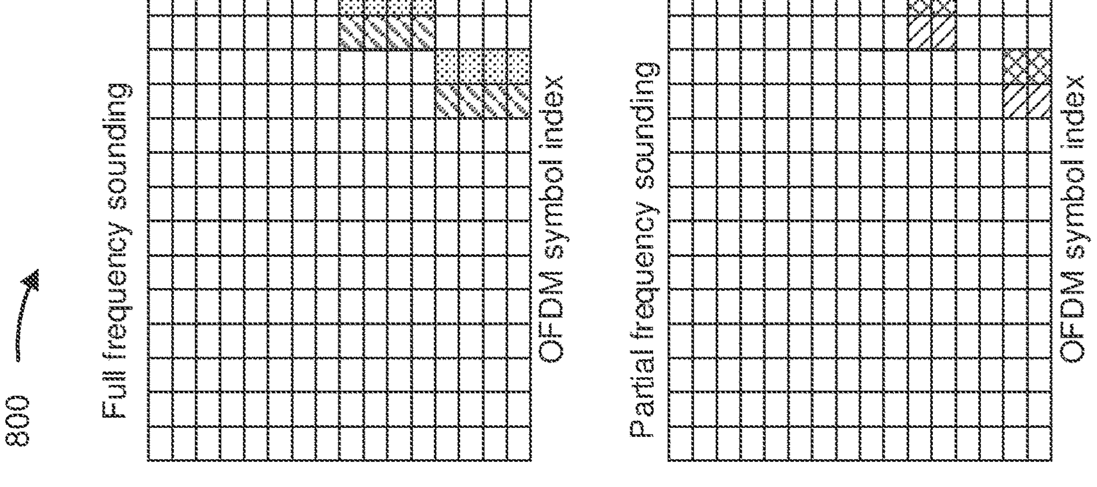
FIG. 8 is a diagram illustrating examples of SRS transmission for a partial frequency sounding SRS using a cyclic shift offset configuration, in accordance with various aspects of the present disclosure.

FIG. 8 is a diagram illustrating examples 800 and 805 of SRS transmission for a partial frequency sounding SRS using a cyclic shift offset configuration, in accordance with various aspects of the present disclosure. An SRS can be configured to perform full frequency sounding (e.g., where RS resources of the SRS are adjacent in the frequency domain so that each frequency hop of the SRS is adjacent in frequency to the previous frequency hop) or partial frequency sounding (e.g., where RS resources of the SRS are spaced from each other in the frequency domain so that each frequency hop of the SRS is separated in frequency from the previous frequency hop). Furthermore, a partial frequency sounding configuration can be associated with a pattern, which indicates the frequency resources used for the partial frequency sounding. For example, example 805 shows an example with a first pattern and a second pattern which are differentiated from each other in frequency.

In example 800, the cyclic shift offset configuration indicates that a different set of cyclic shift offsets is to be used for a full frequency sounding SRS transmission than for a partial frequency sounding SRS transmission. For example, in example 800, a first set of CS offsets (here, CS offsets 1 and 2, though the first set can include any number of CS offsets) are used for full frequency sounding, whereas a second set of CS offsets (here, CS offsets 3 and 4, though the second set can include any number of CS offsets) are used for partial frequency sounding.

In example 805, the cyclic shift offset configuration indicates that a different set of cyclic shift offsets is to be used for a first partial frequency sounding SRS transmission than for a second partial frequency sounding SRS transmission. For example, in example 805, a first set of CS offsets (here, CS offsets 1 and 2, though the first set can include any number of CS offsets) are used for the first partial frequency sounding SRS transmission, whereas a second set of CS offsets (here, CS offsets 3 and 4, though the second set can include any number of CS offsets) are used for the second partial frequency sounding SRS transmission.

In some aspects, the cyclic shift offset configuration may be based at least in part on a function involving a slot associated with the SRS transmission. For example, the cyclic shift offset configuration may indicate that the cyclic shift offset is different for different slots. In some aspects, the cyclic shift offset configuration may identify a set of cyclic shift offsets corresponding to respective slots. For example, a first slot may be configured with a first cyclic shift offset, a second slot may be configured with a second cyclic shift offset, and so on. In some aspects, the cyclic shift offset configuration may be a function of a slot number, such as a slot number within a subframe. For example, the CS offset may be given by the slot number, or may be given by modulo(slot number, X), where X can be configured, pre-configured, determined by the UE 120, dynamically signaled to the UE 120, or the like. In some aspects, the cyclic shift offset configuration may be dynamically signaled to the UE 120. For example, the BS 110 may transmit, for a slot, information (e.g., via dynamic signaling, such as downlink control information or medium access control signaling) indicating a cyclic shift offset to be used for the slot.

Returning to FIG. 5, as shown by reference number 530, in some aspects, the configuration information may indicate a frequency hopping configuration. For example, the configuration information may include a parameter indicating the frequency hopping configuration. A frequency hopping configuration may indicate subcarrier hopping across adjacent RS symbols. For example, a frequency hopping configuration may indicate that an RS transmission is to be performed in a first set of subcarriers for a first RS symbol, a second set of subcarriers for a second RS symbol, and so on. As another example, a frequency hopping configuration may indicate that a first RS symbol of a repetition group is to be transmitted on a first set of subcarriers and a second RS symbol of the repetition group is to be transmitted on a second set of subcarriers.

Figure 9:
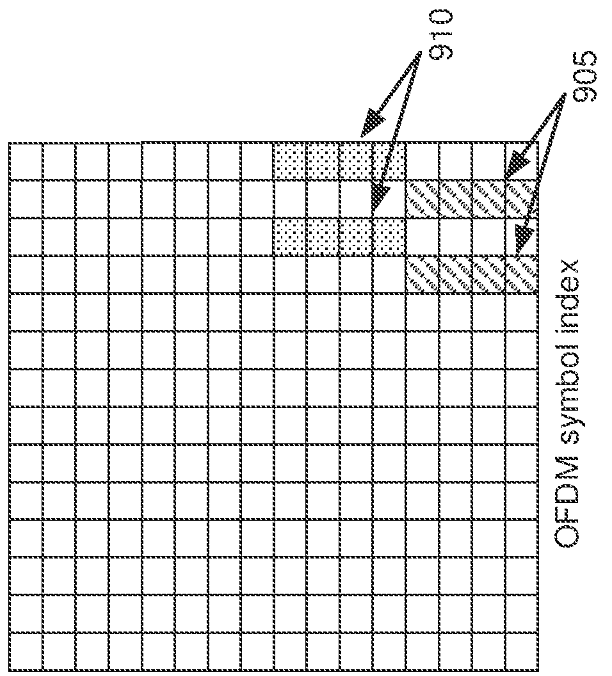
FIG. 9 is a diagram illustrating an example of SRS transmission using a frequency hopping configuration, in accordance with various aspects of the present disclosure.

FIG. 9 is a diagram illustrating an example 900 of SRS transmission using a frequency hopping configuration, in accordance with various aspects of the present disclosure. In example 900, the frequency hopping configuration indicates that different subcarriers can be used for adjacent SRS symbols. Furthermore, the frequency hopping configuration indicates that symbols with a same index of a repetition group can be transmitted using the same set of subcarriers. For example, the RS symbols shown by reference number 905 may be associated with a first index of their respective repetition groups, and the RS symbols shown by reference number 910 may be associated with a second index of their respective repetition groups. Therefore, the RS symbols shown by reference number 905 are transmitted on a first set of subcarriers and the RS symbols shown by reference number 910 are transmitted on a second set of subcarriers.

Returning to FIG. 5, as shown by reference number 535, the UE 120 may implement the configuration for the SRS transmission. For example, the UE 120 may identify RS resources for transmission of the SRS transmission. In some aspects, the UE 120 may determine one or more parameters based at least in part on the configuration information, such as a repetition factor, a sequence hopping configuration, a cyclic shift offset configuration, a frequency hopping configuration, or the like. In some aspects, the UE 120 may determine the one or more parameters based at least in part on a mode, such as a mode indicated by a repetition type of the configuration information. For example, different modes may be defined based at least in part on at least one of the sequence hopping configuration, the cyclic shift offset configuration, the frequency hopping configuration, or one or more combinations thereof. The UE 120 may determine the one or more parameters based at least in part on a selected mode of the different modes.

As shown by reference number 540, the UE 120 may transmit the SRS transmission. For example, the UE 120 may perform an SRS transmission on RS resources identified in accordance with the configuration information. As shown by reference number 545, the BS 110 may receive the SRS transmission. For example, the BS 110 may monitor RS resources for the SRS transmission in accordance with the one or more parameters configured for the UE 120. The BS 110 may determine channel information based at least in part on monitoring the RS resources. In this way, versatility of SRS configuration and transmission is improved, and support for multi-user SRS transmission by way of improved diversity is provided.

As indicated above, FIGS. 5-9 are provided as examples. Other examples may differ from what is described with regard to FIGS. 5-9.

Figure 10:
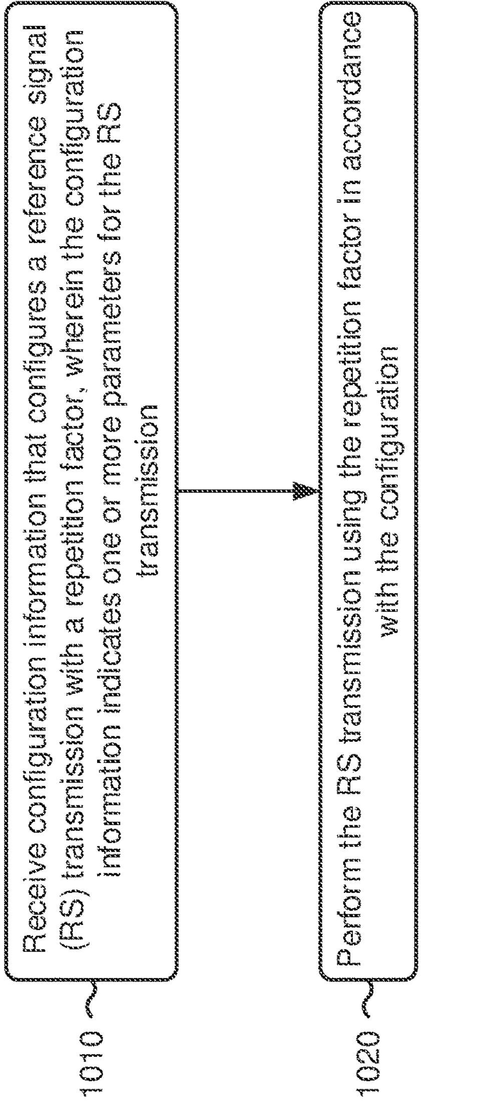
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120) performs operations associated with SRS repetition configuration.

As shown in FIG. 10, in some aspects, process 1000 may include receiving configuration information that configures an RS transmission with a repetition factor, wherein the configuration information indicates one or more parameters for the RS transmission (block 1010). For example, the UE (e.g., using reception component 1202, depicted in FIG. 12) may receive configuration information that configures an RS transmission with a repetition factor. The configuration information may indicate one or more parameters for the RS transmission, such as at least one of a sequence hopping configuration associated with the RS transmission a cyclic shift offset configuration associated with the RS transmission, or a frequency hopping configuration indicating subcarrier hopping across adjacent RS symbols, as described above. In some aspects, the RS transmission is an SRS transmission.

As further shown in FIG. 10, in some aspects, process 1000 may include performing the RS transmission using the repetition factor in accordance with the configuration (block 1020). For example, the UE (e.g., using transmission component 1204, depicted in FIG. 12) may perform the RS transmission using the repetition factor in accordance with the configuration, as described above.

Process 1000 may include additional aspects, such as any single aspect or any combination of aspects described below and/or in connection with one or more other processes described elsewhere herein.

In a first aspect, the sequence hopping configuration indicates that a first sequence is used for two or more RS symbols of the RS transmission in a first set of subcarriers and a second sequence is used for two or more RS symbols of the RS transmission in a second set of subcarriers.

In a second aspect, alone or in combination with the first aspect, the sequence hopping configuration indicates that a first sequence is used for two or more RS symbols of the RS transmission that are associated with a first symbol index in a repetition group, and the sequence hopping configuration indicates that a second sequence is used for two or more RS symbols of the RS transmission that are associated with a second symbol index in a repetition group.

In a third aspect, alone or in combination with one or more of the first and second aspects, the two or more RS symbols of the RS transmission that are associated with the first symbol index are transmitted on different sets of subcarriers.

In a fourth aspect, alone or in combination with one or more of the first through third aspects, the two or more RS symbols of the RS transmission that are associated with the second symbol index are transmitted on different sets of subcarriers.

In a fifth aspect, alone or in combination with one or more of the first through fourth aspects, the cyclic shift offset configuration indicates a plurality of cyclic shift offsets corresponding to a plurality of RS symbols of the RS transmission.

In a sixth aspect, alone or in combination with one or more of the first through fifth aspects, the cyclic shift offset configuration indicates a first cyclic shift offset corresponding to a first set of RS symbols of the RS transmission and a second cyclic shift offset corresponding to a second set of RS symbols of the RS transmission.

In a seventh aspect, alone or in combination with one or more of the first through sixth aspects, the first set of RS symbols is associated with a first set of subcarriers and the second set of RS symbols is associated with a second set of subcarriers.

In an eighth aspect, alone or in combination with one or more of the first through seventh aspects, the first set of RS symbols are associated with a first symbol index and the second set of RS symbols are associated with a second symbol index.

In a ninth aspect, alone or in combination with one or more of the first through eighth aspects, two or more RS symbols of the RS transmission that are associated with the first symbol index are transmitted on different sets of subcarriers.

In a tenth aspect, alone or in combination with one or more of the first through ninth aspects, two or more RS symbols of the RS transmission that are associated with the second symbol index are transmitted on different sets of subcarriers.

In an eleventh aspect, alone or in combination with one or more of the first through tenth aspects, the first set of RS symbols is associated with a partial frequency sounding pattern and the second set of RS symbols is associated with a full frequency sounding pattern.

In a twelfth aspect, alone or in combination with one or more of the first through eleventh aspects, the first set of RS symbols is associated with a first partial frequency sounding pattern and the second set of RS symbols is associated with a second partial frequency sounding pattern.

In a thirteenth aspect, alone or in combination with one or more of the first through twelfth aspects, the cyclic shift offset configuration is based at least in part on a slot associated with the RS transmission.

In a fourteenth aspect, alone or in combination with one or more of the first through thirteenth aspects, the cyclic shift offset configuration indicates a cyclic shift offset based at least in part on a function involving a slot number of a slot associated with the RS transmission.

In a fifteenth aspect, alone or in combination with one or more of the first through fourteenth aspects, the cyclic shift offset configuration indicates a list of cyclic shift offsets to be used for the RS transmission.

In a sixteenth aspect, alone or in combination with one or more of the first through fifteenth aspects, the cyclic shift offset configuration indicates an initial cyclic shift offset, and the process 1000 further comprises determining a list of cyclic shift offsets based at least in part on the initial cyclic shift offset and a pre-defined sequence.

In a seventeenth aspect, alone or in combination with one or more of the first through sixteenth aspects, the RS transmission is associated with a modified maximum number of cyclic shifts based at least in part on the configuration information indicating the one or more parameters for the RS transmission.

In an eighteenth aspect, alone or in combination with one or more of the first through seventeenth aspects, the frequency hopping configuration indicates that a first set of subcarriers is used for a first RS symbol of the adjacent RS symbols and a second set of subcarriers is used for a second RS symbol of the adjacent RS symbols.

In a nineteenth aspect, alone or in combination with one or more of the first through eighteenth aspects, the adjacent RS symbols include a first group of symbols and a second group of symbols, wherein the first RS symbol and the second RS symbol are associated with a first symbol index and a second symbol index of the first group of symbols, respectively, wherein a third RS symbol and a fourth RS symbol are associated with a first symbol index and a second symbol index of the second group of symbols, respectively, wherein the first set of subcarriers is used for the third RS symbol, and wherein the second set of subcarriers is used for the fourth RS symbol.

In a twentieth aspect, alone or in combination with one or more of the first through nineteenth aspects, the configuration information indicates a mode, and the one or more parameters are defined in accordance with the mode.

In a twenty-first aspect, alone or in combination with one or more of the first through twentieth aspects, the configuration information indicates a repetition group associated with the one or more parameters.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
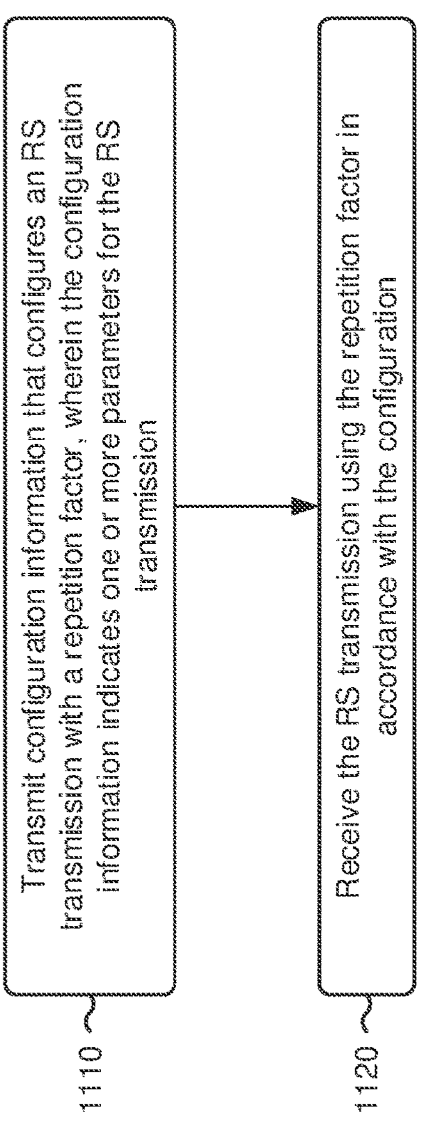
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where the base station (e.g., base station 110) performs operations associated with SRS repetition configuration.

As shown in FIG. 11, in some aspects, process 1100 may include transmitting configuration information that configures an RS transmission with a repetition factor, wherein the configuration information indicates one or more parameters for the RS transmission (block 1110). For example, the base station (e.g., using transmission component 1304, depicted in FIG. 13) may transmit configuration information that configures an RS transmission with a repetition factor, wherein the configuration information indicates one or more parameters for the RS transmission. The one or more parameters may include at least one of: a sequence hopping configuration associated with the RS transmission, a cyclic shift offset configuration associated with the RS transmission, or a frequency hopping configuration indicating subcarrier hopping across adjacent RS symbols, as described above. In some aspects, the RS transmission is an SRS transmission.

As further shown in FIG. 11, in some aspects, process 1100 may include receiving the RS transmission using the repetition factor in accordance with the configuration (block 1120). For example, the base station (e.g., using reception component 1302, depicted in FIG. 13) may receive the RS transmission using the repetition factor in accordance with the configuration, as described above.

Process 1100 may include additional aspects, such as any single aspect or any combination of aspects described below and/or in connection with one or more other processes described elsewhere herein.

In a first aspect, the sequence hopping configuration indicates that a first sequence is used for two or more RS symbols of the RS transmission in a first set of subcarriers and a second sequence is used for two or more RS symbols of the RS transmission in a second set of subcarriers.

In a second aspect, alone or in combination with the first aspect, the sequence hopping configuration indicates that a first sequence is used for two or more RS symbols of the RS transmission that are associated with a first symbol index in a repetition group, and the sequence hopping configuration indicates that a second sequence is used for two or more RS symbols of the RS transmission that are associated with a second symbol index in a repetition group.

In a third aspect, alone or in combination with one or more of the first and second aspects, the two or more RS symbols of the RS transmission that are associated with the first symbol index are transmitted on different sets of subcarriers.

In a fourth aspect, alone or in combination with one or more of the first through third aspects, the two or more RS symbols of the RS transmission that are associated with the second symbol index are transmitted on different sets of subcarriers.

In a fifth aspect, alone or in combination with one or more of the first through fourth aspects, the cyclic shift offset configuration indicates a plurality of cyclic shift offsets corresponding to a plurality of RS symbols of the RS transmission.

In a sixth aspect, alone or in combination with one or more of the first through fifth aspects, the cyclic shift offset configuration indicates a first cyclic shift offset corresponding to a first set of RS symbols of the RS transmission and a second cyclic shift offset corresponding to a second set of RS symbols of the RS transmission.

In a seventh aspect, alone or in combination with one or more of the first through sixth aspects, the first set of RS symbols is associated with a first set of subcarriers and the second set of RS symbols is associated with a second set of subcarriers.

In an eighth aspect, alone or in combination with one or more of the first through seventh aspects, the first set of RS symbols are associated with a first symbol index and the second set of RS symbols are associated with a second symbol index.

In a ninth aspect, alone or in combination with one or more of the first through eighth aspects, two or more RS symbols of the RS transmission that are associated with the first symbol index are transmitted on different sets of subcarriers.

In a tenth aspect, alone or in combination with one or more of the first through ninth aspects, two or more RS symbols of the RS transmission that are associated with the second symbol index are transmitted on different sets of subcarriers.

In an eleventh aspect, alone or in combination with one or more of the first through tenth aspects, the first set of RS symbols is associated with a partial frequency sounding configuration and the second set of RS symbols is associated with a full frequency sounding configuration.

In a twelfth aspect, alone or in combination with one or more of the first through eleventh aspects, the first set of RS symbols is associated with a first partial frequency sounding configuration and the second set of RS symbols is associated with a second partial frequency sounding configuration.

In a thirteenth aspect, alone or in combination with one or more of the first through twelfth aspects, the cyclic shift offset configuration is based at least in part on a slot associated with the RS transmission.

In a fourteenth aspect, alone or in combination with one or more of the first through thirteenth aspects, the cyclic shift offset configuration indicates a cyclic shift offset based at least in part on a function involving a slot number of a slot associated with the RS transmission.

In a fifteenth aspect, alone or in combination with one or more of the first through fourteenth aspects, the cyclic shift offset configuration indicates a list of cyclic shift offsets to be used for the RS transmission.

In a sixteenth aspect, alone or in combination with one or more of the first through fifteenth aspects, the cyclic shift offset configuration indicates an initial cyclic shift offset, and a list of cyclic shift offsets is defined based at least in part on the initial cyclic shift offset and a pre-defined sequence.

In a seventeenth aspect, alone or in combination with one or more of the first through sixteenth aspects, the RS transmission is associated with a modified maximum number of cyclic shifts based at least in part on the configuration information indicating the one or more parameters for the RS transmission.

In an eighteenth aspect, alone or in combination with one or more of the first through seventeenth aspects, the frequency hopping configuration indicates that a first set of subcarriers is used for a first RS symbol of the adjacent RS symbols and a second set of subcarriers is used for a second RS symbol of the adjacent RS symbols.

In a nineteenth aspect, alone or in combination with one or more of the first through eighteenth aspects, the adjacent RS symbols include a first group of symbols and a second group of symbols, wherein the first RS symbol and the second RS symbol are associated with a first symbol index and a second symbol index of the first group of symbols, respectively, wherein a third RS symbol and a fourth RS symbol are associated with a first symbol index and a second symbol index of the second group of symbols, respectively, wherein the first set of subcarriers is used for the third RS symbol, and wherein the second set of subcarriers is used for the fourth RS symbol.

In a twentieth aspect, alone or in combination with one or more of the first through nineteenth aspects, the configuration information indicates a mode, and the one or more parameters are defined in accordance with the mode.

In a twenty-first aspect, alone or in combination with one or more of the first through twentieth aspects, the configuration information indicates a repetition group associated with the one or more parameters.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
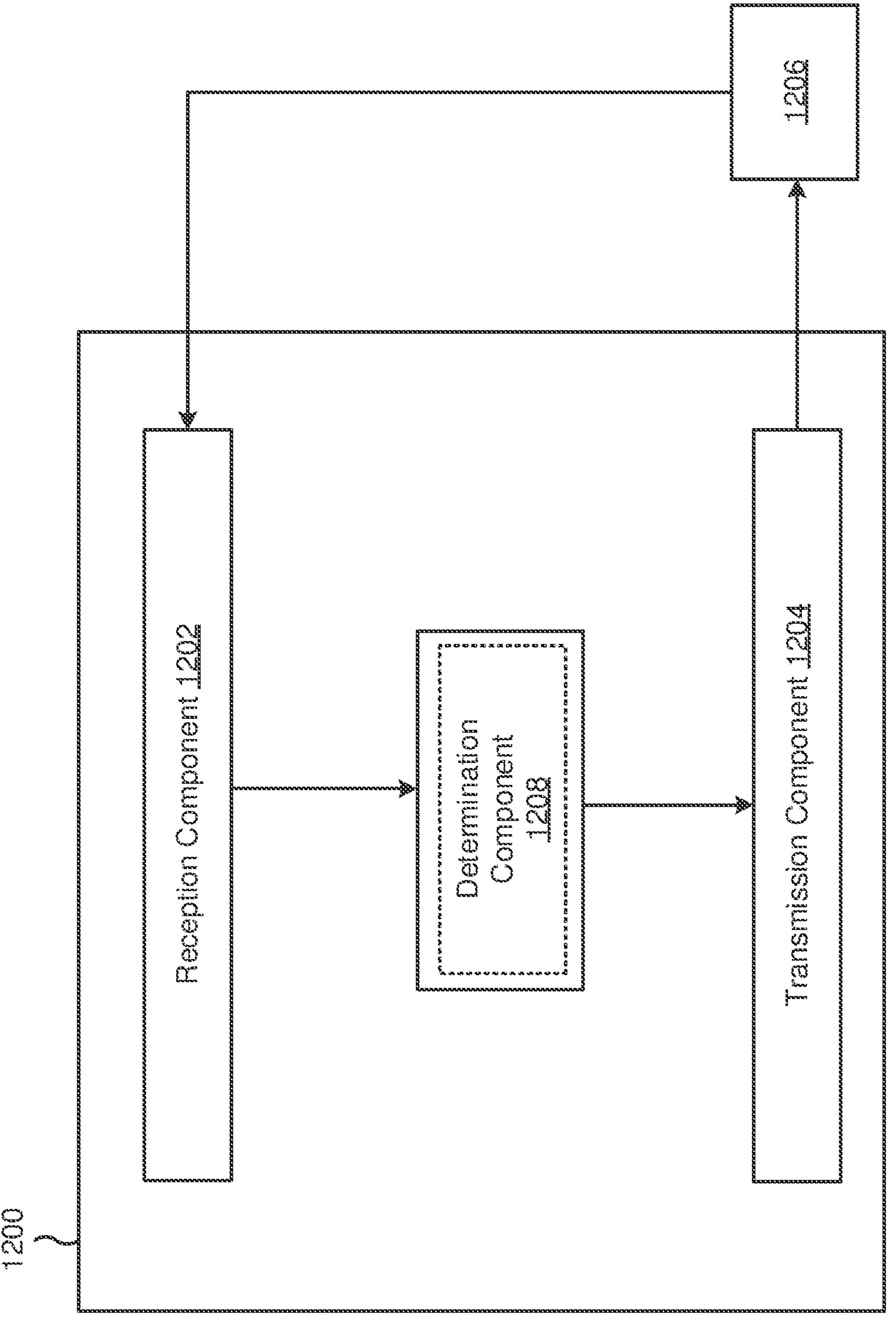
FIG. 12 is a block diagram of an example apparatus for wireless communication, in accordance with various aspects of the present disclosure.

FIG. 12 is a block diagram of an example apparatus 1200 for wireless communication, in accordance with various aspects of the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 4-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The reception component 1202 may receive configuration information that configures an RS transmission with a repetition factor, wherein the configuration information indicates one or more parameters for the RS transmission including at least one of a sequence hopping configuration associated with the RS transmission, a cyclic shift offset configuration associated with the RS transmission, or a frequency hopping configuration indicating subcarrier hopping across adjacent RS symbols. The transmission component 1204 may perform the RS transmission using the repetition factor in accordance with the configuration. The determination component 1208 may determine or implement the one or more parameters based at least in part on the configuration information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
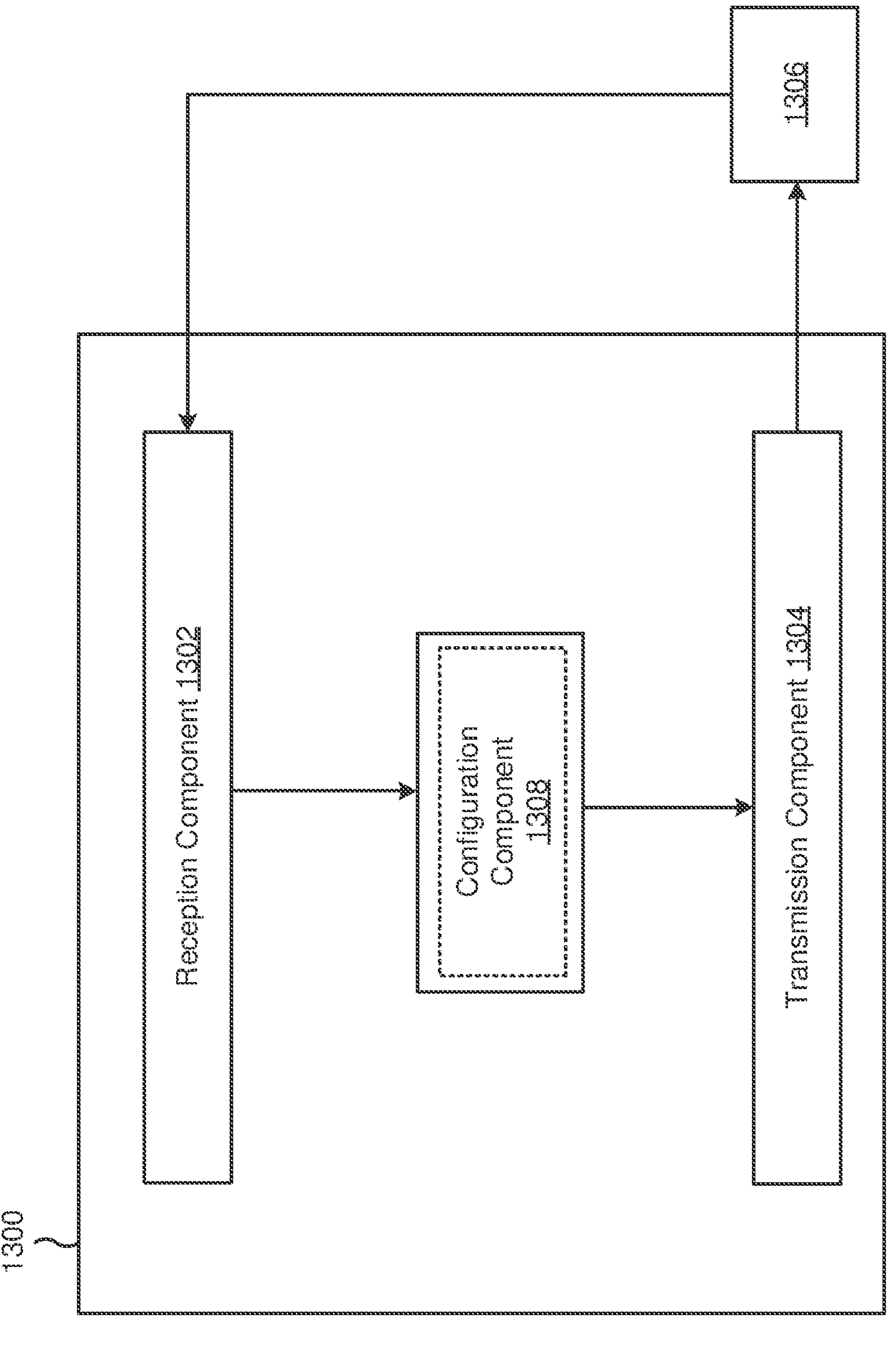
FIG. 13 is a block diagram of an example apparatus for wireless communication, in accordance with various aspects of the present disclosure.

FIG. 13 is a block diagram of an example apparatus 1300 for wireless communication, in accordance with various aspects of the present disclosure. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a configuration component 1308, among other examples.

In some aspects, the apparatus 1300 may be configured to perform one or more operations described herein in connection with FIGS. 4-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The transmission component 1304 may transmit configuration information that configures an RS transmission with a repetition factor, wherein the configuration information indicates one or more parameters for the RS transmission including at least one of a sequence hopping configuration associated with the RS transmission, a cyclic shift offset configuration associated with the RS transmission, or a frequency hopping configuration indicating subcarrier hopping across adjacent RS symbols. The reception component 1302 may receive the RS transmission using the repetition factor in accordance with the configuration. The configuration component 1308 may determine the configuration information and/or cause the transmission component 1304 to transmit the configuration information.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some aspects of the present disclosure:

Aspect 1: A method of wireless communication performed by a user equipment (UE), comprising: receiving configuration information that configures a reference signal (RS) transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and performing the RS transmission using the repetition factor in accordance with the configuration.

Aspect 2: The method of aspect 1, wherein the sequence hopping configuration indicates that a first sequence is used for two or more RS symbols of the RS transmission in a first set of subcarriers and a second sequence is used for two or more RS symbols of the RS transmission in a second set of subcarriers.

Aspect 3: The method of aspect 1, wherein the sequence hopping configuration indicates that a first sequence is used for two or more RS symbols of the RS transmission that are associated with a first symbol index in a repetition group, and wherein the sequence hopping configuration indicates that a second sequence is used for two or more RS symbols of the RS transmission that are associated with a second symbol index in a repetition group.

Aspect 4: The method of aspect 3, wherein the two or more RS symbols of the RS transmission that are associated with the first symbol index are transmitted on different sets of subcarriers.

Aspect 5: The method of aspect 3, wherein the two or more RS symbols of the RS transmission that are associated with the second symbol index are transmitted on different sets of subcarriers.

Aspect 6: The method of any of aspects 1-5, wherein the cyclic shift offset configuration indicates a plurality of cyclic shift offsets corresponding to a plurality of RS symbols of the RS transmission.

Aspect 7: The method of any of aspects 1-5, wherein the cyclic shift offset configuration indicates a first cyclic shift offset corresponding to a first set of RS symbols of the RS transmission and a second cyclic shift offset corresponding to a second set of RS symbols of the RS transmission.

Aspect 8: The method of aspect 7, wherein the first set of RS symbols is associated with a first set of subcarriers and the second set of RS symbols is associated with a second set of subcarriers.

Aspect 9: The method of aspect 7, wherein the first set of RS symbols are associated with a first symbol index and the second set of RS symbols are associated with a second symbol index.

Aspect 10: The method of aspect 9, wherein two or more RS symbols of the RS transmission that are associated with the first symbol index are transmitted on different sets of subcarriers.

Aspect 11: The method of aspect 9, wherein two or more RS symbols of the RS transmission that are associated with the second symbol index are transmitted on different sets of subcarriers.

Aspect 12: The method of aspect 7, wherein the first set of RS symbols is associated with a partial frequency sounding pattern and the second set of RS symbols is associated with a full frequency sounding pattern.

Aspect 13: The method of aspect 7, wherein the first set of RS symbols is associated with a first partial frequency sounding pattern and the second set of RS symbols is associated with a second partial frequency sounding pattern.

Aspect 14: The method of any of aspects 1-13, wherein the cyclic shift offset configuration is based at least in part on a slot associated with the RS transmission.

Aspect 15: The method of any of aspects 1-14, wherein the cyclic shift offset configuration indicates a cyclic shift offset based at least in part on a function involving a slot number of a slot associated with the RS transmission.

Aspect 16: The method of aspect any of aspects 1-15, wherein the cyclic shift offset configuration indicates a list of cyclic shift offsets to be used for the RS transmission.

Aspect 17: The method of any of aspects 1-16, wherein the cyclic shift offset configuration indicates an initial cyclic shift offset, and wherein the method further comprises: determining a list of cyclic shift offsets based at least in part on the initial cyclic shift offset and a pre-defined sequence.

Aspect 18: The method of any of aspects 1-17, wherein the RS transmission is associated with a modified maximum number of cyclic shifts based at least in part on the configuration information indicating the one or more parameters for the RS transmission.

Aspect 19: The method of any of aspects 1-18, wherein the frequency hopping configuration indicates that a first set of subcarriers is used for a first RS symbol of the adjacent RS symbols and a second set of subcarriers is used for a second RS symbol of the adjacent RS symbols.

Aspect 20: The method of aspect 19, wherein the adjacent RS symbols include a first group of symbols and a second group of symbols, wherein the first RS symbol and the second RS symbol are associated with a first symbol index and a second symbol index of the first group of symbols, respectively, wherein a third RS symbol and a fourth RS symbol are associated with a first symbol index and a second symbol index of the second group of symbols, respectively, wherein the first set of subcarriers is used for the third RS symbol, and wherein the second set of subcarriers is used for the fourth RS symbol.

Aspect 21: The method of nay of aspects 1-20, wherein the configuration information indicates a mode, and wherein the one or more parameters are defined in accordance with the mode.

Aspect 22: The method of any of aspects 1-21, wherein the configuration information indicates a repetition group associated with the one or more parameters.

Aspect 23: A method of wireless communication performed by a base station, comprising: transmitting configuration information that configures a reference signal (RS) transmission with a repetition factor, wherein the configuration information indicates one or more parameters for the RS transmission including at least one of: a sequence hopping configuration associated with the RS transmission, a cyclic shift offset configuration associated with the RS transmission, or a frequency hopping configuration indicating subcarrier hopping across adjacent RS symbols; and receiving the RS transmission using the repetition factor in accordance with the configuration.

Aspect 24: The method of aspect 23, wherein the sequence hopping configuration indicates that a first sequence is used for two or more RS symbols of the RS transmission in a first set of subcarriers and a second sequence is used for two or more RS symbols of the RS transmission in a second set of subcarriers.

Aspect 25: The method of aspect 23, wherein the sequence hopping configuration indicates that a first sequence is used for two or more RS symbols of the RS transmission that are associated with a first symbol index in a repetition group, and wherein the sequence hopping configuration indicates that a second sequence is used for two or more RS symbols of the RS transmission that are associated with a second symbol index in a repetition group.

Aspect 26: The method of aspect 25, wherein the two or more RS symbols of the RS transmission that are associated with the first symbol index are transmitted on different sets of subcarriers.

Aspect 27: The method of aspect 25, wherein the two or more RS symbols of the RS transmission that are associated with the second symbol index are transmitted on different sets of subcarriers.

Aspect 28: The method of any of aspects 23-27, wherein the cyclic shift offset configuration indicates a plurality of cyclic shift offsets corresponding to a plurality of RS symbols of the RS transmission.

Aspect 29: The method of any of aspects 23-28, wherein the cyclic shift offset configuration indicates a first cyclic shift offset corresponding to a first set of RS symbols of the RS transmission and a second cyclic shift offset corresponding to a second set of RS symbols of the RS transmission.

Aspect 30: The method of aspect 29, wherein the first set of RS symbols is associated with a first set of subcarriers and the second set of RS symbols is associated with a second set of subcarriers.

Aspect 31: The method of aspect 29, wherein the first set of RS symbols are associated with a first symbol index and the second set of RS symbols are associated with a second symbol index.

Aspect 32: The method of aspect 31, wherein two or more RS symbols of the RS transmission that are associated with the first symbol index are transmitted on different sets of subcarriers.

Aspect 33: The method of aspect 31, wherein two or more RS symbols of the RS transmission that are associated with the second symbol index are transmitted on different sets of subcarriers.

Aspect 34: The method of aspect 29, wherein the first set of RS symbols is associated with a partial frequency sounding configuration and the second set of RS symbols is associated with a full frequency sounding configuration.

Aspect 35: The method of aspect 29, wherein the first set of RS symbols is associated with a first partial frequency sounding configuration and the second set of RS symbols is associated with a second partial frequency sounding configuration.

Aspect 36: The method of any of aspects 23-35, wherein the cyclic shift offset configuration is based at least in part on a slot associated with the RS transmission.

Aspect 37: The method of any of aspects 23-36, wherein the cyclic shift offset configuration indicates a cyclic shift offset based at least in part on a function involving a slot number of a slot associated with the RS transmission.

Aspect 38: The method of any of aspects 23-37, wherein the cyclic shift offset configuration indicates a list of cyclic shift offsets to be used for the RS transmission.

Aspect 39: The method of any of aspects 23-38, wherein the cyclic shift offset configuration indicates an initial cyclic shift offset, and wherein a list of cyclic shift offsets is defined based at least in part on the initial cyclic shift offset and a pre-defined sequence.

Aspect 40: The method of any of aspects 23-39, wherein the RS transmission is associated with a modified maximum number of cyclic shifts based at least in part on the configuration information indicating the one or more parameters for the RS transmission.

Aspect 41: The method of any of aspects 23-40, wherein the frequency hopping configuration indicates that a first set of subcarriers is used for a first RS symbol of the adjacent RS symbols and a second set of subcarriers is used for a second RS symbol of the adjacent RS symbols.

Aspect 42: The method of aspect 41, wherein the adjacent RS symbols include a first group of symbols and a second group of symbols, wherein the first RS symbol and the second RS symbol are associated with a first symbol index and a second symbol index of the first group of symbols, respectively, wherein a third RS symbol and a fourth RS symbol are associated with a first symbol index and a second symbol index of the second group of symbols, respectively, wherein the first set of subcarriers is used for the third RS symbol, and wherein the second set of subcarriers is used for the fourth RS symbol.

Aspect 43: The method of any of aspects 23-42, wherein the configuration information indicates a mode, and wherein the one or more parameters are defined in accordance with the mode.

Aspect 44: The method of any of aspects 23-43, wherein the configuration information indicates a repetition group associated with the one or more parameters.

Aspect 45: An apparatus for wireless communication at a device, comprising a processor; memory coupled with the processor; and instructions stored in the memory and executable by the processor to cause the apparatus to perform the method of one or more aspects of aspects 1-22.

Aspect 46: A device for wireless communication, comprising a memory and one or more processors coupled to the memory, the memory and the one or more processors configured to perform the method of one or more aspects of aspects 1-22.

Aspect 47: An apparatus for wireless communication, comprising at least one means for performing the method of one or more aspects of aspects 1-22.

Aspect 48: A non-transitory computer-readable medium storing code for wireless communication, the code comprising instructions executable by a processor to perform the method of one or more aspects of aspects 1-22.

Aspect 49: A non-transitory computer-readable medium storing a set of instructions for wireless communication, the set of instructions comprising one or more instructions that, when executed by one or more processors of a device, cause the device to perform the method of one or more aspects of aspects 1-22.

Aspect 50: An apparatus for wireless communication at a device, comprising a processor, memory coupled with the processor; and instructions stored in the memory and executable by the processor to cause the apparatus to perform the method of one or more aspects of aspects 23-44.

Aspect 51: A device for wireless communication, comprising a memory and one or more processors coupled to the memory, the memory and the one or more processors configured to perform the method of one or more aspects of aspects 23-44.

Aspect 52: An apparatus for wireless communication, comprising at least one means for performing the method of one or more aspects of aspects 23-44.

Aspect 53: A non-transitory computer-readable medium storing code for wireless communication, the code comprising instructions executable by a processor to perform the method of one or more aspects of aspects 23-44.

Aspect 54: A non-transitory computer-readable medium storing a set of instructions for wireless communication, the set of instructions comprising one or more instructions that, when executed by one or more processors of a device, cause the device to perform the method of one or more aspects of aspects 23-44.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors coupled to the memory and configured to:

receive configuration information that configures a reference signal (RS) transmission with a repetition factor, wherein the configuration information indicates one or more parameters for the RS transmission including a cyclic shift offset configuration associated with the RS transmission, wherein the cyclic shift offset configuration indicates a cyclic shift offset based at least in part on a function involving a slot number of a slot associated with the RS transmission, wherein the one or more parameters for the RS transmission include a sequence hopping configuration associated with the RS transmission, wherein the sequence hopping configuration indicates that a first sequence is used for two or more RS symbols of the RS transmission that are associated with a first symbol index in a repetition group, and wherein the sequence hopping configuration indicates that a second sequence is used for two or more RS symbols of the RS transmission that are associated with a second symbol index in the repetition group; and perform the RS transmission using the repetition factor in accordance with the configuration.

2. The UE of claim 1, wherein the one or more parameters for the RS transmission include a sequence hopping configuration associated with the RS transmission, and wherein the sequence hopping configuration indicates that a first sequence is used for two or more RS symbols of the RS transmission in a first set of subcarriers and a second sequence is used for two or more RS symbols of the RS transmission in a second set of subcarriers.

3. The UE of claim 1, wherein the two or more RS symbols of the RS transmission that are associated with the first symbol index are transmitted on different sets of subcarriers.

4. The UE of claim 1, wherein the two or more RS symbols of the RS transmission that are associated with the second symbol index are transmitted on different sets of subcarriers.

5. The UE of claim 1, wherein the cyclic shift offset configuration indicates a plurality of cyclic shift offsets corresponding to a plurality of RS symbols of the RS transmission.

6. The UE of claim 1, wherein the cyclic shift offset configuration indicates a first cyclic shift offset corresponding to a first set of RS symbols of the RS transmission and a second cyclic shift offset corresponding to a second set of RS symbols of the RS transmission.

7. The UE of claim 6, wherein the first set of RS symbols is associated with a first set of subcarriers and the second set of RS symbols is associated with a second set of subcarriers.

8. The UE of claim 6, wherein the first set of RS symbols are associated with a first symbol index and the second set of RS symbols are associated with a second symbol index.

9. The UE of claim 8, wherein two or more RS symbols of the RS transmission that are associated with the first symbol index are transmitted on different sets of subcarriers.

10. The UE of claim 8, wherein two or more RS symbols of the RS transmission that are associated with the second symbol index are transmitted on different sets of subcarriers.

11. The UE of claim 6, wherein the first set of RS symbols is associated with a partial frequency sounding pattern and the second set of RS symbols is associated with a full frequency sounding pattern.

12. The UE of claim 6, wherein the first set of RS symbols is associated with a first partial frequency sounding pattern and the second set of RS symbols is associated with a second partial frequency sounding pattern.

13. The UE of claim 1, wherein the cyclic shift offset configuration is based at least in part on a slot associated with the RS transmission.

14. The UE of claim 1, wherein the cyclic shift offset configuration indicates a list of cyclic shift offsets to be used for the RS transmission.

15. The UE of claim 1, wherein the cyclic shift offset configuration indicates an initial cyclic shift offset, and wherein the one or more processors are configured to:

determine a list of cyclic shift offsets based at least in part on the initial cyclic shift offset and a pre-defined sequence.

16. The UE of claim 1, wherein the RS transmission is associated with a modified maximum number of cyclic shifts based at least in part on the configuration information indicating the one or more parameters for the RS transmission.

17. The UE of claim 1, wherein the one or more parameters for the RS transmission include a frequency hopping configuration indicating subcarrier hopping across adjacent RS symbols, and wherein the frequency hopping configuration indicates that a first set of subcarriers is used for a first RS symbol of the adjacent RS symbols and a second set of subcarriers is used for a second RS symbol of the adjacent RS symbols.

18. The UE of claim 17, wherein the adjacent RS symbols include a first group of symbols and a second group of symbols, wherein the first RS symbol and the second RS symbol are associated with a first symbol index and a second symbol index of the first group of symbols, respectively, wherein a third RS symbol and a fourth RS symbol are associated with a first symbol index and a second symbol index of the second group of symbols, respectively, wherein the first set of subcarriers is used for the third RS symbol, and wherein the second set of subcarriers is used for the fourth RS symbol.

19. The UE of claim 1, wherein the configuration information indicates a mode, and wherein the one or more parameters are defined in accordance with the mode.

20. The UE of claim 1, wherein the configuration information indicates the repetition group associated with the one or more parameters.

21. A base station for wireless communication, comprising:

a memory; and one or more processors coupled to the memory and configured to:

transmit configuration information that configures a reference signal (RS) transmission with a repetition factor, wherein the configuration information indicates one or more parameters for the RS transmission including a cyclic shift offset configuration associated with the RS transmission, wherein the cyclic shift offset configuration indicates a cyclic shift offset based at least in part on a function involving a slot number of a slot associated with the RS transmission, wherein the one or more parameters for the RS transmission include a sequence hopping configuration associated with the RS transmission, wherein the sequence hopping configuration indicates that a first sequence is used for two or more RS symbols of the RS transmission that are associated with a first symbol index in a repetition group, and wherein the sequence hopping configuration indicates that a second sequence is used for two or more RS symbols of the RS transmission that are associated with a second symbol index in the repetition group; and receive the RS transmission using the repetition factor in accordance with the configuration.

22. The base station of claim 21, wherein the one or more parameters for the RS transmission include a sequence hopping configuration associated with the RS transmission, and wherein the sequence hopping configuration indicates that a first sequence is used for two or more RS symbols of the RS transmission in a first set of subcarriers and a second sequence is used for two or more RS symbols of the RS transmission in a second set of subcarriers.

23. The base station of claim 21, wherein the configuration information indicates a mode, and wherein the one or more parameters are defined in accordance with the mode.

24. The base station of claim 21, wherein the configuration information indicates the repetition group associated with the one or more parameters.

25. A method of wireless communication performed by a user equipment (UE), comprising:

receiving configuration information that configures a reference signal (RS) transmission with a repetition factor, wherein the configuration information indicates one or more parameters for the RS transmission including a cyclic shift offset configuration associated with the RS transmission, wherein the cyclic shift offset configuration indicates a cyclic shift offset based at least in part on a function involving a slot number of a slot associated with the RS transmission, wherein the one or more parameters for the RS transmission include a sequence hopping configuration associated with the RS transmission, wherein the sequence hopping configuration indicates that a first sequence is used for two or more RS symbols of the RS transmission that are associated with a first symbol index in a repetition group, and wherein the sequence hopping configuration indicates that a second sequence is used for two or more RS symbols of the RS transmission that are associated with a second symbol index in the repetition group; and performing the RS transmission using the repetition factor in accordance with the configuration.

26. The method of claim 25, wherein the one or more parameters for the RS transmission include a sequence hopping configuration associated with the RS transmission, and wherein the sequence hopping configuration indicates that a first sequence is used for two or more RS symbols of the RS transmission in a first set of subcarriers and a second sequence is used for two or more RS symbols of the RS transmission in a second set of subcarriers.

27. The method of claim 25, wherein the cyclic shift offset configuration indicates a first cyclic shift offset corresponding to a first set of RS symbols of the RS transmission and a second cyclic shift offset corresponding to a second set of RS symbols of the RS transmission, and wherein the first set of RS symbols is associated with a partial frequency sounding pattern and the second set of RS symbols is associated with a full frequency sounding pattern.

28. A method of wireless communication performed by a base station, comprising:

transmitting configuration information that configures a reference signal (RS) transmission with a repetition factor, wherein the configuration information indicates one or more parameters for the RS transmission including a cyclic shift offset configuration associated with the RS transmission, wherein the cyclic shift offset configuration indicates a cyclic shift offset based at least in part on a function involving a slot number of a slot associated with the RS transmission, wherein the one or more parameters for the RS transmission include a sequence hopping configuration associated with the RS transmission, wherein the sequence hopping configuration indicates that a first sequence is used for two or more RS symbols of the RS transmission that are associated with a first symbol index in a repetition group, and wherein the sequence hopping configuration indicates that a second sequence is used for two or more RS symbols of the RS transmission that are associated with a second symbol index in the repetition group; and receiving the RS transmission using the repetition factor in accordance with the configuration.

29. The method of claim 28, wherein the configuration information indicates a mode, and wherein the one or more parameters are defined in accordance with the mode.

30. The method of claim 28, wherein the cyclic shift offset configuration indicates a first cyclic shift offset corresponding to a first set of RS symbols of the RS transmission and a second cyclic shift offset corresponding to a second set of RS symbols of the RS transmission, and wherein the first set of RS symbols is associated with a partial frequency sounding pattern and the second set of RS symbols is associated with a full frequency sounding pattern.

* * * * *